Feb. 14, 1967 — C. V. WILHERE — 3,303,633
CONTAINER CAPPING APPARATUS
Filed Dec. 8, 1964 — 2 Sheets-Sheet 1
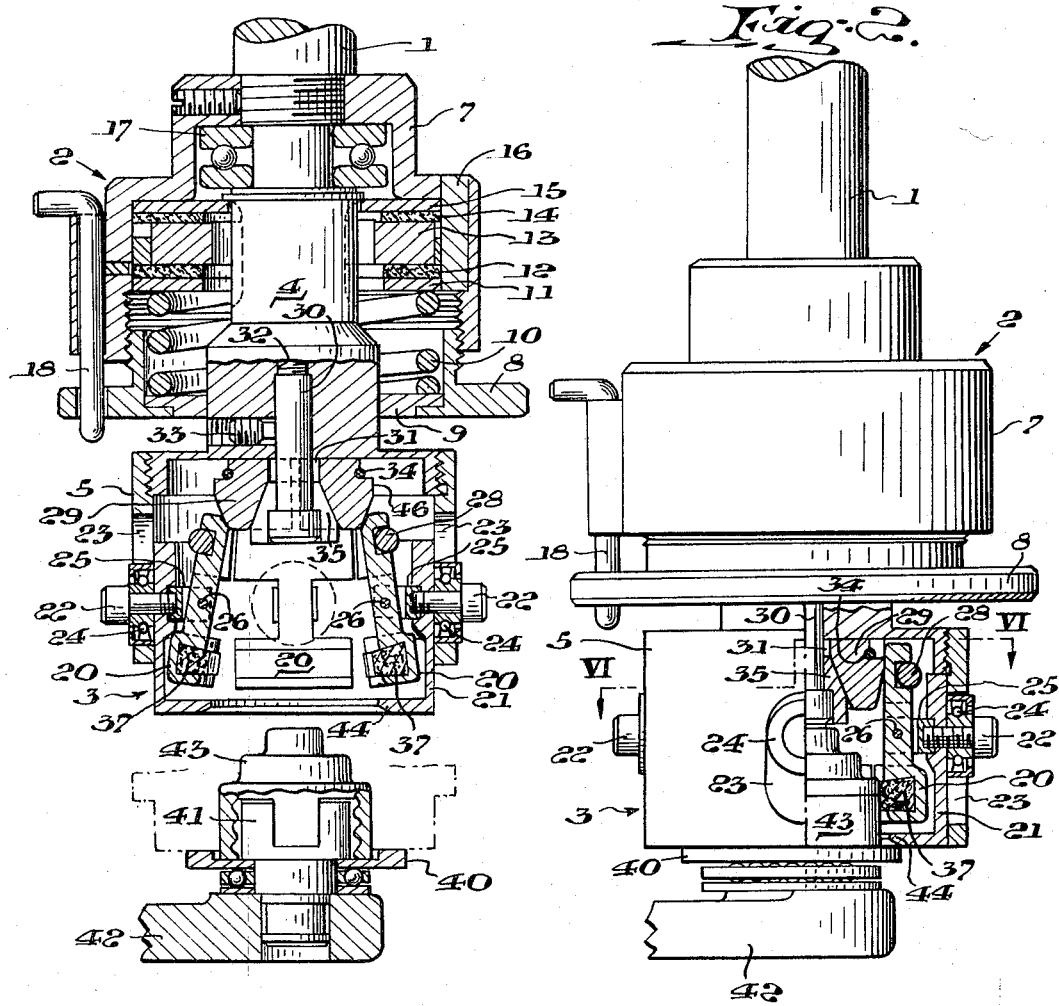
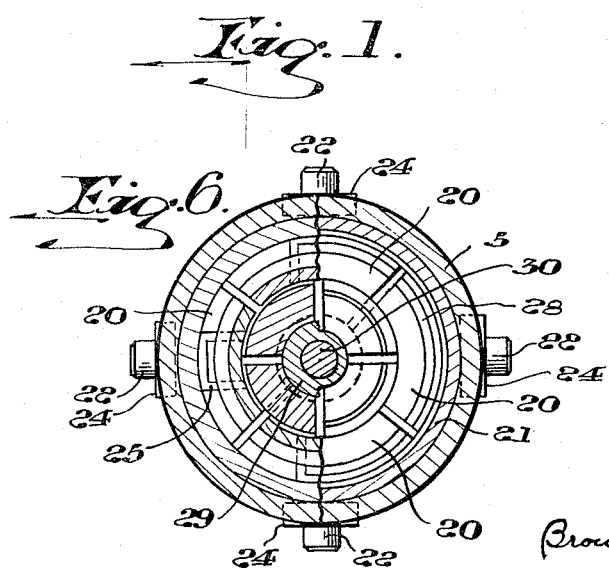
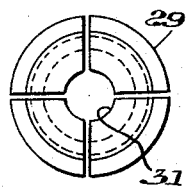
INVENTOR.
CHARLES V. WILHERE
BY
Brown, Critchlow, Flick & Peckham
his ATTORNEYS.

Feb. 14, 1967  C. V. WILHERE  3,303,633
CONTAINER CAPPING APPARATUS
Filed Dec. 8, 1964  2 Sheets-Sheet 2
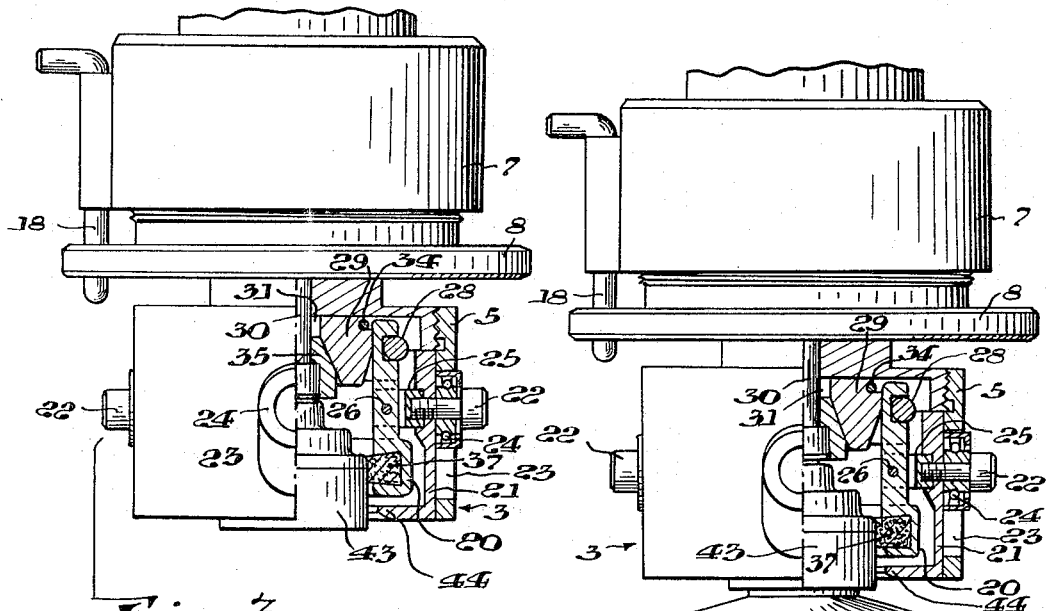
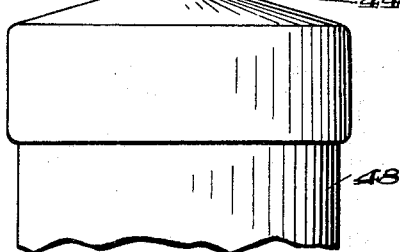
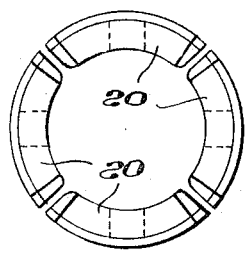
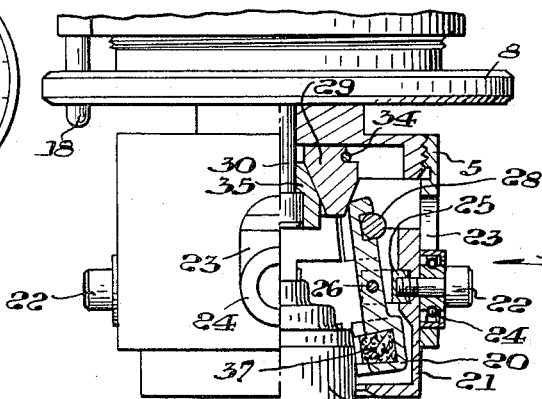
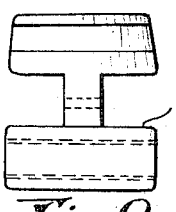
INVENTOR.
CHARLES V. WILHERE.
BY
Brown, Critchlow, Flick & Peckham
ATTORNEYS.

United States Patent Office 3,303,633
Patented Feb. 14, 1967

3,303,633
CONTAINER CAPPING APPARATUS
Charles V. Wilhere, Pittsburgh, Pa., assignor to Horix Manufacturing Company, Pittsburgh, Pa., a corporation of Pennsylvania
Filed Dec. 8, 1964, Ser. No. 416,735
14 Claims. (Cl. 53—306)

This invention relates to machines for screwing caps onto containers, and more particularly to the chucks in which the caps are held.

It is among the objects of this invention to provide container capping apparatus, in which the cap-receiving chuck is self-contained, is simple in construction and operation, is clamped onto a cap by merely lowering the chuck against the cap support, is released from the screwed-on cap by merely lifting the chuck, and in which no part of the chuck engages the top of the cap.

In accordance with this invention, a hollow downwardly opening chuck body is rotatable on a vertical axis, such as by a rotatable vertically movable spindle above it. Inside the body there are opposed upright jaws around its axis that are movable vertically and radially. Means are supported by the chuck body for holding the jaws against rotation around its axis and for normally supporting them in a lowered position in the body. Mounted in the upper part of the chuck body is a cam that has an inclined surface beside the upper ends of the jaws, which are pressed radially against it. Means, such as the spindle, is provided for lowering and raising the chuck body. Mounted below the chuck body is a cap support for stopping downward movement of the jaws when their lower ends are in a position to straddle a screw cap on the support. Thereafter, further lowering of the body will move the cam downward relative to the jaws in order to move their upper ends radially in the direction that will move their lower ends inwardly into frictional engagement with a cap on the support. Above its inclined surface, the cam has a more nearly vertical surface for frictional engagement by the upper ends of the jaws to hold them there when the lowered chuck body is raised, thereby permitting a cap to be lifted from the support. The jaws are formed for greater frictional engagement with the cap than with the upper cam surface, so that after the cap has been screwed onto a container by the rotating chuck and the chuck body is raised, the cam will slide upwardly on the jaws and thereby permit the grip of their lower ends on the cap to be released. A clutch may be mounted between the spindle and the chuck so that when a predetermined torque has been applied to the cap in screwing it onto a container the chuck will stop rotating while the spindle continues to rotate.

The preferred embodiment of the invention is illustrated in the accompanying drawings, in which FIG. 1 is a vertical section through the capping apparatus;

FIG. 2 is a side view, partly in section, showing the chuck lowered over a cap and gripping it;

FIG. 3 is a similar view showing the cap lifted from its support by the chuck;

FIG. 4 is a similar view showing the cap screwed onto a container by the rotating chuck;

FIG. 5 is a similar view of the chuck just as the jaws have been released from the cap;

FIG. 6 is a horizontal section, taken on the line VI—VI of FIG. 2;

FIG. 7 is a plan view of the cam alone;

FIG. 8 is a plan view of the jaws alone; and

FIG. 9 is an elevation of a jaw.

The capping apparatus disclosed herein can be used with a capping machine having a vertically movable rotatable spindle. Such a machine, for example, is shown in the copending patent application of Charles V. Wilhere, Serial Number 360,652, filed April 17, 1964. Now referring to the drawings in the present application, the spindle is designated by the reference numeral 1 and it is to be understood that it can be rotated continuously if desired and periodically lowered and raised, such as disclosed in said copending application. Referring to FIG. 1 herein, a conventional clutch 2 is shown mounted on the lower end of the spindle. The clutch supports a chuck 3 below it. In fact, the lower end of the clutch hub 4 may be integral with the top of an inverted cup-like housing 5 that forms the downwardly opening body of the chuck. The top of the clutch housing 7 is rigidly connected to the lower end of the spindle, from which the housing extends downwardly around hub 4. Screwed into the bottom of the clutch housing is a flanged ring 8 that supports a bushing-washer 9 encircling the lower part of the hub. Resting on this collar is a coil spring 10, the top of which engages a metal washer 11 pressing an annular clutch disc 12 against the bottom of an annular clutch plate 13 splined on the hub. The top of this plate presses against another clutch disc 14 that engages a metal washer 15 engaging a shoulder in the housing. The washers and discs are prevented from rotating in the housing by means of a key 16 extending down into the housing and through notches in the washers and discs. Encircling the reduced upper end of the hub there is a thrust bearing 17. The pressure of the clutch discs against the clutch plate can be adjusted by turning the bottom ring 8 in the clutch housing and then locking it in the desired position by means of a vertical pin 18 supported by the housing. It will be seen that with such a clutch, whenever the chuck is restrained from rotating, the spindle can continue to rotate because the clutch discs will slide on the upper and lower surfaces of the stationary clutch plate.

Inside the hollow chuck body 5 there are several opposed upright jaws 20 that can move vertically as well as radially therein. These jaws are spaced around the common axis of the chuck body and spindle. They are held from rotation around that axis preferably by a sleeve 21 that also supports them. The sleeve is slidably mounted in the chuck body, where it is supported by radial studs 22 extending out through vertical slots 23 in the side of the body. The lower ends of the slots are closed in order to support the studs. The studs may be formed from cap screws screwed into the sleeve and encircled in the slots by roller bearings 24 that are held in place by the heads of the screws and that substantially engage the opposite sides of the slots. The inner end of each stud or screw supports a clevis 25, in which the central portion of one of the jaws is mounted on a horizontal pivot pin 26 so that the jaw can pivot in a radial plane of the sleeve.

Normally, gravity will hold the sleeve in its lower position in the chuck body, with the upper ends of the jaws spaced some distance below the top of the body as shown in FIG. 1. In this position the upper ends are held by an encircling spring ring 28 against the downwardly converging or conical surface of a central cam 29 that extends down between them a short distance. This cam, which may be circular in horizontal section, is held against the top of the chuck body by a screw 30 that extends up through a central passage 31 in the cam and into a threaded bore 32 in the clutch hub, where the screw is locked by a radial set screw 33 in the side of the hub. To permit the spacing between the upper ends of the jaws to be adjusted, the cam may be divided vertically into segments that are held around its supporting screw by means of an elastic ring 34 encircling the cam. In such a case, the passage through the cam is tapered upwardly and the wall of the passage is engaged by a conical bushing or wedge 35 mounted on the screw. It will be seen that if the screw is moved upwardly the wedge will force the cam segments apart, while if it is moved downwardly the elastic ring will pull them together, whereby the diameter of the cam can be expanded or contracted.

The lower ends of the jaws are provided with inwardly opening recesses, in which friction pads 37 are mounted. The pads project a short distance from the recesses.

In order to pick up a cap that is to be screwed onto a container, the chuck is moved over a cap support, or the latter is moved under the chuck by an arm or the like. The cap support includes a disc 40 that encircles a button 41 mounted on the arm 42 as shown in FIG. 1. The disc is coaxial with the chuck and preferably is rotatable. It projects outwardly from beneath any cap 43 deposited on the button. The opening in the lower end of sleeve 21 is large enough to accommodate the cap, but the bottom of the sleeve has an inturned flange 44 that can engage the top of disc 40 around the cap.

Assuming that the cap and chuck are in vertical alignment and the chuck is spinning, the spindle is lowered to lower the sleeve over the cap until the sleeve engages disc 40, as indicated by the dotted lines in FIG. 1. At this moment the lower ends of the jaws are still far enough apart to have passed down beside the cap to straddle it. However, continued lowering of the chuck body 5 causes the body to move downward on the vertically stationary sleeve and this movement pushes the tapered cam down between the upper ends of the pivoted jaws as shown in FIG. 2. The result is that the cam swings the upper ends of the jaws apart and thereby swings their lower ends in tightly against the sides of the cap. Before the downward movement of the cam has been completed, a more nearly vertical surface 46 of the cam above its inclined surface slides down between the jaws. The friction between this upper surface of cam and the upper ends of the jaws is sufficient to overcome the weight of the jaws and sleeve and hold them in their upper position in the chuck body when the chuck next is raised by means of the spindle, with the result that the cap is lifted by the chuck away from its supporting button as shown in FIG. 3. It will be noted that the top of the cap does not touch the cam or any other part of the chuck, so a cap with an irregular top can be picked up just as well as a cap with a plain top.

The chuck then is moved laterally over a filled container 48 provided with a threaded neck, or the container is moved beneath the chuck after the cap support has been moved out of the way. The container is gripped firmly in a well-known manner on its support, which is located at any desired level below the chuck and on which it is held in vertical alignment with the chuck. The rotating chuck is moved downwardly again and as it does so it screws the cap onto the container as shown in FIG. 4. As soon as the cap has been screwed up tight, the clutch starts to slip and the chuck stops rotating.

The next thing that happens is that the chuck body is raised again. However, since the friction of the jaw pads against the cap is greater than the friction of the jaws against cam surface 46, the jaws stay in engagement with the cap for a moment while the cam is pulled upwardly away from the sleeve. This brings the tapered portion of the cam into engagement with the upper ends of the jaws so that the spring around them can swing them inwardly and release the lower ends of the jaws from the cap as shown in FIG. 5. The chuck immediately starts to rotate again, but its sleeve and jaws remain in their lower position until the bottoms of slots 23 engage roller bearings 24, whereupon the entire chuck rises away from the cap and container. The cycle of first picking up a screw cap and then screwing it onto the neck of a container then is repeated.

This capping apparatus has the advantages over known cappers of not requiring the top of the cap to engage the chuck and not requiring rods or the like above the chuck for operating the jaws. The chuck therefore is self-contained and does not require anything more than the usual means for lowering and raising it and by which it is supported.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Container capping apparatus comprising a hollow downwardly opening chuck body rotatable on a vertical axis, opposed upright jaws in said body around said axis movable vertically and radially, means supported by the chuck body holding the jaws against rotation around its axis and for normally supporting them in a lower position in the body, a cam mounted in the upper part of said body and having an inclined surface beside the upper ends of the jaws, means pressing said ends radially against said cam surface, means for lowering and raising the chuck body, and a cap support mounted below said body for stopping downward movement of the jaws when their lower ends are in a position to straddle a screw cap on said support, further lowering of said body being adapted to move the cam downward relative to the jaws in order to move their upper ends radially, the cam being formed to move said upper ends in a direction that will move the lower ends of the jaws inwardly into frictional engagement with a cap, the cam having above said inclined surface a more nearly vertical surface for frictional engagement by the upper ends of the jaws to hold them there when the lowered chuck body is raised, whereby a cap can be lifted from said support, and the jaws being formed for greater frictional engagement with the cap than with said upper cam surface.

2. Container capping apparatus according to claim 1, in which said greater frictional engagement is provided by friction pads secured to the lower ends of the jaws.

3. Container capping apparatus according to claim 1, in which said pressing means is an annular spring engaging the side of the upper ends of the jaws opposite their cam-engaging side.

4. Container capping apparatus according to claim 1, in which said cap support is rotatable on said vertical axis.

5. Container capping apparatus according to claim 1, including a vertically movable rotatable spindle above said chuck body and coaxial therewith, and a friction clutch mounted on the lower end of the spindle and supporting said body below it.

6. Container capping apparatus according to claim 1, in which said cam is manually expandable and contractable to adjust the spacing between the upper ends of the jaws.

7. Container capping apparatus according to claim 6, in which said cam is divided vertically into sections and is provided with a central vertical passage having an upwardly converging side wall, said apparatus including a vertically adjustable wedge in said passage engaging said wall, and an elastic ring surrounding the cam and pressing said sections against the wedge.

8. Container capping apparatus according to claim 1, in which said jaw-holding means include a sleeve surrounding said jaws and vertically movable in said chuck body, and means supported by the chuck body holding the sleeve against rotation therein and normally supporting it in a lower position in the body.

9. Container capping apparatus according to claim 8, in which said sleeve extends below the jaws for engagement with said cap support when the chuck body is lowered.

10. Container capping apparatus according to claim 8, in which said sleeve-supporting means include studs projecting radially outward from the sleeve at circumferentially spaced points, said chuck body being provided with vertical slots slidably receiving said studs and having closed lower ends.

11. Container capping apparatus comprising a hollow downwardly opening chuck body rotatable on a vertical axis, a sleeve vertically movable in said body, means supported by the chuck body holding the sleeve against rotation therein and for normally supporting it in a lower position in the body, opposed upright jaws pivotally mounted on transverse axes in the sleeve around said vertical axis, a central cam mounted in the upper part of said body and having a downwardly converging surface extending down between the upper ends of the jaws, means pressing said ends against said cam surface, a cap support mounted below said sleeve, and means for lowering and raising the chuck body to lower the sleeve into engagement with said support so that the lower ends of the jaws can straddle a screw cap on the support, further lowering of said body being adapted to move the cam downward between the jaws and thereby force their upper ends apart in order to swing their lower ends into frictional engagement with a cap, the cam having above said converging surface a more nearly vertical surface for frictionl engagement by said forced-apart upper ends of the jaws to hold them there when the lowered chuck body is raised, whereby a cap can be lifted from said support, and the jaws being formed for greater frictional engagement with the cap than with said upper cam surface.

12. Container capping apparatus according to claim 11, in which said pressing means is a spring ring encircling the upper ends of the jaws.

13. Container capping apparatus according to claim 11, in which said chuck body is provided with a plurality of circumferentially spaced vertical slots having closed lower ends, and said sleeve-supporting means include radial studs mounted in said sleeve and extending through said slots for vertical movement therein.

14. Container capping apparatus according to claim 13, including a clevis pivotally supporting each jaw, each clevis being rigidly mounted on the inner end of one of said studs.

References Cited by the Examiner
UNITED STATES PATENTS

| 1,651,903 | 12/1927 | Pennock | 53—317 X |
| 1,797,679 | 3/1931 | Clark | 53—308 X |
| 3,242,632 | 3/1966 | Dimond | 53—308 X |

FRANK E. BAILEY, *Primary Examiner.*

R. L. FARRIS, *Assistant Examiner.*